United States Patent
Letzel et al.

[11] 3,838,747
[45] Oct. 1, 1974

[54] INTERIOR HANDLE FOR MOTOR VEHICLES

[75] Inventors: Karl Letzel, Sindelfingen; Helmut Stober, Doffingen; Elmar Nickel, Sindelfingen, all of Germany

[73] Assignee: Daimler-Benz Aktiengesellschaft, Stuttgart-Unterturkheim, Germany

[22] Filed: Apr. 3, 1972

[21] Appl. No.: 240,391

[30] Foreign Application Priority Data
Apr. 3, 1971  Germany............................ 2116346

[52] U.S. Cl. .................................................. 180/90
[51] Int. Cl............................................. B60h 1/24
[58] Field of Search................... 180/90; 280/150 B; 16/111 R, 110.5, 114 R; 296/71, 153; 244/129 R, 139 D; 105/354

[56] References Cited
UNITED STATES PATENTS

| | | |
|---|---|---|
| 2,039,503 | 5/1936 | Tjaarda............................... 180/90 |
| 2,165,660 | 7/1939 | Snyder................................ 180/90 |
| 2,222,320 | 11/1940 | Morgen............................ 16/111 R |
| 2,677,415 | 5/1954 | Brink .............................. 16/111 R |
| 2,683,478 | 7/1954 | Seelig.............................. 116/110.5 |
| 3,040,832 | 6/1962 | Wilfert................................ 180/90 |
| 3,577,903 | 5/1971 | Eggert................................... 98/2 |

Primary Examiner—David Schonberg
Assistant Examiner—Terrance L. Siemens
Attorney, Agent, or Firm—Craig & Antonelli

[57] ABSTRACT

An interior handle for motor vehicles which, together with further devices, such as indicating instruments, control elements, adjusting members and/or vent nozzles, is arranged within the area of the instrument panel of the motor vehicle and which includes end portions on both sides of the handle portion; at least one of the further devices is connected with the handle and is arranged in one of its end portions.

20 Claims, 4 Drawing Figures

INTERIOR HANDLE FOR MOTOR VEHICLES

The present invention relates to an interior handle for motor vehicles which together with other devices, namely, indicating instruments, control elements, adjusting members and/or venting nozzles is arranged within the area of the instrument panel of the motor vehicle and includes a handle portion with end portions disposed on both sides of the handle portion.

In motor vehicles, a large number of devices such as indicating instruments, adjusting members, venting nozzles, hold-on and boarding handles and the like are to be arranged especially within the area of the instrument panel. This frequently leads to difficulties, inter alia, from the points of view of good visibility, of the internal safety and of the aimed-at good optical impression, since many of the mentioned devices should lie as much as possible within the immediate range of reach of the driver or co-driver.

The present invention is now concerned with the task to arrange and construct individual ones of the mentioned devices in such a manner that a particularly space-saving over-all arrangement can be realized which permits a favorable location and manipulation of as many of the devices as possible.

This is achieved according to the present invention in that at least one of the further devices is connected with the interior handle and is arranged in an end portion thereof. The possibility is created thereby to arrange, in addition to the interior handle which, of course, is to be placed in an optimum manner, additional ones of the mentioned auxiliary devices within the zone occupied by the interior handle without impairing the accessibility to the interior handle and the optical over-all impression and without, reversely, making more difficult the accessibility to the other devices by the presence of the interior hold-on handle.

The construction of hold-on handles, and more particularly of external hold-on handles as supports for antennas and/or spray nozzles is known as such in trucks. However, it serves an entirely different purpose. More particularly, it is to be prevented by such prior art construction of the external hold-on handles that persons which carry out the servicing and repair word at the truck, thereby hold on at the usual antenna or spray nozzle fastening means which are not designed normally for such loads and therefore can be damaged relatively easily by such a use.

With hold-on handles secured in the usual manner within the area of the end portions thereof, it is appropriate within the scope of the present invention if an aperture or recess extending transversely to the support or abutment surface of the end portion is provided in at least one end portion, into which one of the devices is adapted to be inserted because good connecting possibilities thus exist for the devices inserted into the end portions.

A particularly good space utilization is achieved according to the present invention in that apertures or recesses for devices to be inserted therein are provided in both end portions. One of these devices may be constituted with advantage by a vent nozzle and the other by an adjusting mechanism If, according to the present invention, the interior hold-on handle is arranged at the instrument panel of the motor vehicle in an upright plane, then it is appropriate if the recess or aperture provided in the upper portion of the handle receives the venting nozzle so that a wide adjusting range is produced thereby for the venting nozzle, which enables to blow air against the windshield pane as also against a side window or, in the alternative, toward the passengers. The recess or aperture accommodating the venting nozzle may constitute within its area adjacent the support surface simultaneously a part of the air supply duct or channel.

If with a hold-on handle arranged in an upright plane of the instrument panel of the motor vehicle, the recess or aperture provided within the lower end portion thereof accommodates an adjusting member for the floor vent flap of the motor vehicle, then with a vent nozzle provided in the upper end portion of the handle, a handle combination results that is equally suited for the arrangement in front of the driver and of the co-driver seat and that additionally represents a combination of the devices which as a rule are coordinated separately also to the co-driver seat, i.e., to the front seat disposed alongside the driver seat. A hold-on handle which is constructed in such a manner may serve in an advantageous manner as boarding handle in an arrangement within the area of the forward door column of a truck driver cab.

It is constructively appropriate if the top surfaces of the end portions of the hold-on handle pass over continuously into the top surface of the handle portion thereof and if the end portions are constructed enlarged or widened with respect to the handle portion at least within the areas thereof that contain the recesses or apertures.

In order to assure a favorable fastening of the interior hold-on handle which is form-rigid in itself and in order to protect in particular the coupling connections leading to the devices arranged in the end portions of the handle against damages due to movements or displacements of the handle with respect to the instrument panel, it is appropriate if the support surfaces of the end portions are disposed at an angle to one another so that a reciprocal support results. This can be further improved in that at least the support surface of one end portion is bent off and has a section that is disposed in a plane containing the support surface of the other end portion.

In order to avoid dangers to the passengers by the hold-on handle in case of accidents, it may be appropriate to form the handle from a synthetic plastic foamed element of any suitable material, for example, of foamed synthetic resinous material provided with an outer cover, whereby a support framework is embedded into foamed plastic element.

Accordingly, it is an object of the present invention to provide a handle for motor vehicles which avoids by simple means the aforementioned shortcomings and drawbacks encountered in the prior art.

Another object of the present invention resides in an interior handle for motor vehicles serving as hold-on handle for the passengers, which is simple in construction yet permits the incorporation of other devices into the same.

A further object of the present invention resides in an interior hold-on handle for motor vehicles which assures a space-saving over-all arrangement, a favorable installation at the instrument panel and a convenient manipulation of the auxiliary devices incorporated therein.

A further object of the present invention resides in a handle combined with other auxiliary devices which does not impair the visibility and accessibility of the remaining instruments and actuating members provided on the instrument panel and which does not deter from the aesthetic appearance of the instrument panel.

Still another object of the present invention resides in a handle of the type described above for use on the inside of a motor vehicle which not only permits a good space utilization but enables an easy connection of the auxiliary devices incorporated in the handle with other parts connected thereto.

Another object of the present invention resides in a hold-on handle for use on the inside of the vehicle which can be used, in its identical construction, on the side of the driver seat as also on the side of the co-driver.

A further object of the present invention resides in an interior handle for motor vehicles of the type described above which not only minimizes the injury danger to the passengers but also assures a safe and secure mounting at the instrument panel without danger of relative movement.

These and further objects, features and advantages of the present invention will become more apparent from the following description when taken in connection with the accompanying drawing which shows, for purposes of illustration only, one embodiment in accordance with the present invention, and wherein.

Figure 1:
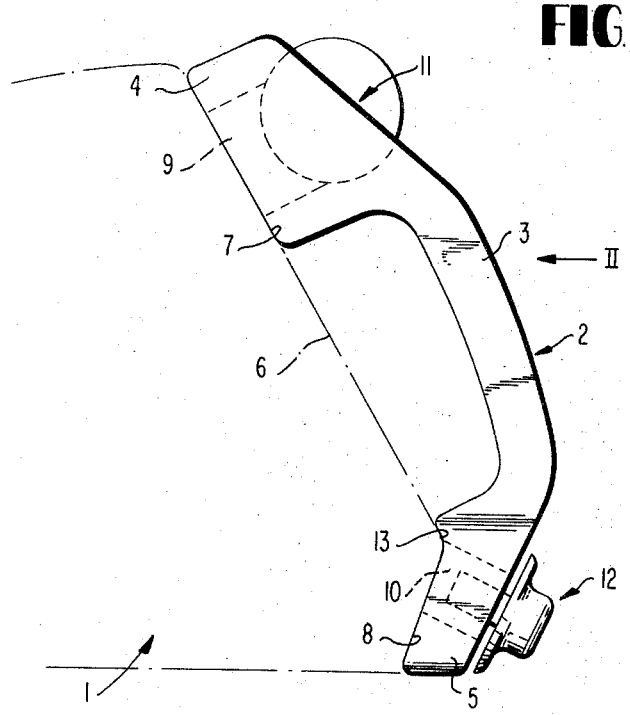
FIG. 1 is a side view of an interior hold-on handle according to the present invention in its installed position on an instrument panel indicated herein schematically in cross section.

Referring now to the drawing wherein like reference numerals are used throughout the two views to designate like parts, reference numeral 1 generally designates in FIG. 1 an instrument panel which is shown in cross section exclusively with its external contours. An interior hold-on handle generally designated by reference numeral 2 is mounted on the instrument panel 1. The interior hold-on handle 2 includes a handle portion 3, properly speaking, which passes over on both sides thereof into end portions 4 and 5, by way of which the handle 2 is supported on the instrument panel 1 by conventional means. The end portions 4 and 5 are provided transversely to their support surfaces 7 and 8 resting on the outer surface 6 of the instrument panel 1 with recesses or apertures 9 and 10 which extend through the end portions 4 and 5.

Figure 4:
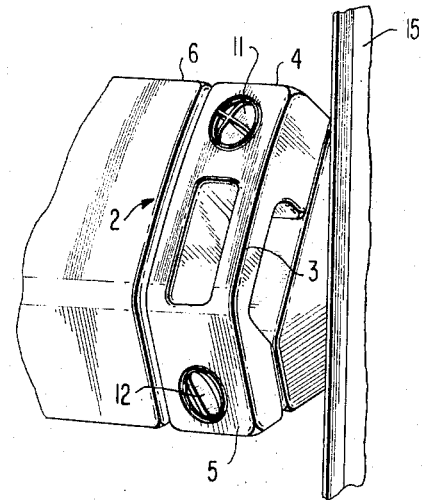
FIG. 4 is a perspective view of the handle according to the present invention arranged as a boarding handle within the area of a forward door column.

In the illustrated embodiment, in which the interior handle 2 is mounted lying against the instrument panel 1 essentially in an upright plane, the upper aperture 9 serves for the accommodation of a vent nozzle 11 which is illustrated herein by an adjustable flap or valve. In contradistinction, an adjusting member generally designated by reference numeral 12, for example, for the floor vent valve or flap of a motor vehicle, is provided in the lower aperture 10. Also, this adjusting member 12 which is of conventional construction is illustrated only schematically. The connecting line leading from the adjusting member 12 to the floor vent valve is not shown for the sake of simplicity as is also the case for the air guide duct or channel which, on the side of the instrument panel, adjoins the aperture 9 which forms in its area adjoining the instrument panel 9 also an air guide channel or duct. A combination results from the accommodation of the vent nozzle 11 and of the adjusting member 12 within the end portions 4 and 5 of the interior handle 2 which enables a space-saving combination of the parts that is correct as to functional requirements, which are provided in a large number of vehicles within the area of reach of the driver and/or of the co-driver at the instrument panel 1. In lieu of a vent nozzle 11, or of an adjusting member 12, of course, also other devices or instruments 20 as normally provided within the area of the instrument panel can be combined with the hold-on handle even though the illustrated construction represents a preferred embodiment. With particular advantage, as shown in FIG. 4, the illustrated construction can also be used as boarding-handle combination in truck driver-cabs whereby the hold-on handle 2 is arranged within the area of the front door columns generally designated by the reference numeral 15.

In order to be able to absorb in a favorable manner the forces exerted on the hold-on handle 2, it is appropriate to coordinate the support surfaces 7 and 8 corresponding to mutually angularly disposed sections of the outer surfaces 6 of the instrument panel 1. As a result thereof, the conventional fastening means 16 for the handle 2 which are provided within the area of the end portions 4 and 5, can be realized relatively readily. The support effect obtained by the angular position of the support surfaces 7 and 8 can be still further improved in that, as shown for the support surface 8, one of these surfaces is constructed angularly bent and includes a section 13 which is disposed in a plane containing the other support surface, in the illustrated embodiment therefore the support surface 7.

Figure 2:
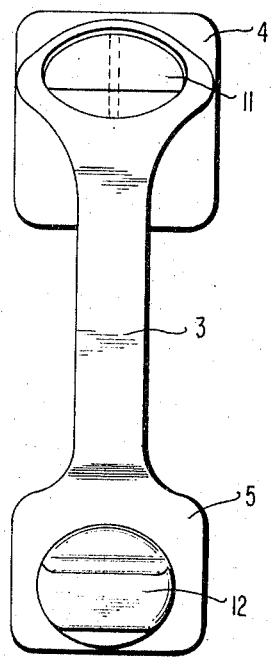
FIG. 2 is an elevational view of the handle according to FIG. 1, taken in the direction of arrow II.

In order to enable a favorable arrangement of the devices to be accommodated in the end portions 4 and 5, for example, of the vent nozzle 11 and of the adjusting member 12, the end portions 4 and 5 may be constructed widened with respect to the handle portion 3 as shown in FIG. 2. Furthermore, it is appropriate to cause the top sides of the end surfaces 4 and 5 to pass over continuously into the top surface of the handle portion 3 in order to realize in every case a good access to the hold-on handle. It may be further appropriate to that end to so construct the apertures or recesses 9 and 10 that the devices to be accommodated within the same are arranged therein recessed which, however, is not illustrated in the drawing. The latter is frequently also desirable for reasons of internal safety.

Figure 3:
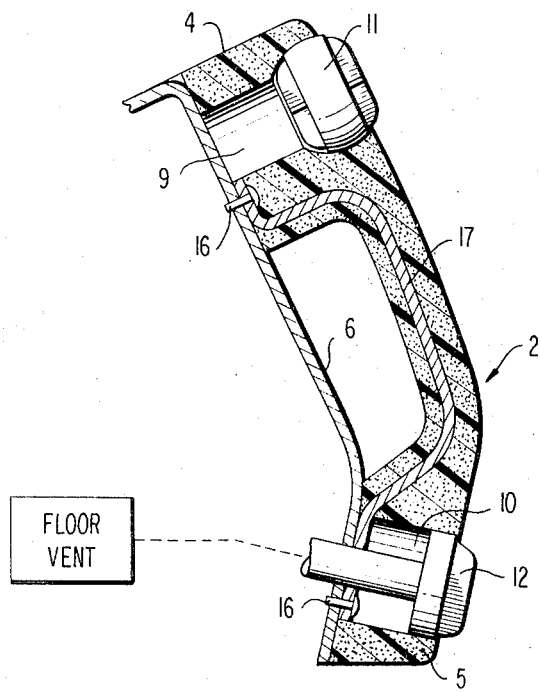
FIG. 3 is a sectional view of the handle according to the present invention illustrating the support frame embedded therein.

A foamed synthetic plastic element made, for example, from conventional foamed synthetic resinous material and provided with an outer cover may thereby serve as material for the interior handle according to the present invention, into which is embedded a support frame 17, as shown in FIG. 3, It is appropriate to foam-in during the manufacture of the foamed body simultaneously also the vent nozzle and the adjusting member.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An interior handle for motor vehicles which is arranged together with further auxiliary control means and vehicle condition indicator means within the area of an instrument panel of the motor vehicle, said handle comprising: a handle portion, said handle portion being provided with end portions disposed on both sides thereof for mounting the same on the instrument panel, and means provided in at least one of said end portions for connecting at least one of the further auxiliary control means and vehicle condition indicator means with the handle.

2. An interior handle according to claim 1, wherein said further auxiliary control and indicator means include at least one of the elements consisting of indicating instruments, control elements, adjusting members and vent nozzles.

3. An interior handle according to claim 1, wherein said handle is provided with support surface means, and wherein at least one of the end portions of the handle is provided with an aperture extending substantially transversely to the respective support surface means of said one end portion for receiving at least one of said auxiliary control means and indicator means.

4. An interior handle according to claim 1, wherein the end portions include support surface means which are disposed at an angle to one another.

5. An interior handle according to claim 1, wherein the handle is arranged as boarding handle combination within the area of a forward door column of a truck driver-cab.

6. An interior handle for motor vehicle which is arranged together with further auxiliary control means and vehicle condition indicator means within the area of an instrument panel of the motor vehicle, said handle comprising: a handle portion, said handle portion being provided with end portions disposed on both sides thereof, at least one of the further auxiliary control means and vehicle condition indicator means being connected with the handle and disposed in one of said end portions, said further auxiliary control means and vehicle condition indicator means including a vent nozzle and an adjusting member and an aperture provided in both end portions, one of said aperture accommodating said vent nozzle and the other aperture accommodating said adjusting member.

7. An interior handle according to claim 6, wherein the handle is arranged at the instrument panel of the motor vehicle in an upright plane with the upper aperture receiving the vent nozzle.

8. An interior handle according to claim 5 wherein said aperture receiving the vent nozzle forms simultaneously a portion of an air guide supply channel.

9. An interior handle according to claim 8, wherein said adjusting member is operatively connected with a floor vent valve of the vehicle, and wherein the lower aperture means accommodates said adjusting member for the floor vent valve.

10. An interior handle according to claim 9, wherein the handle is arranged as boarding handle combination within the area of a forward door column of a truck driver-cab.

11. An interior handle according to claim 9, wherein the top surfaces of the end portions of the handle pass over substantially continuously into the top surface of the handle portion and the end portions are constructed widened at least within the areas thereof containing the aperture as compared to the handle portion.

12. An interior handle according to claim 11, wherein the end portions of the handle include support surface means which are disposed at an angle to one another.

13. An interior handle according to claim 12, wherein the support surface means of one end portion is angularly bent off and includes a section that is disposed in a plane substantially containing the support surface means of the other end portion.

14. An interior handle according to claim 13, wherein the handle has a form-rigid construction and is constituted by an element made of foamed plastic material which is provided with an outer cover means and into which is embedded a support frame.

15. An interior handle according to claim 14, wherein the handle is arranged as boarding handle combination within the area of a forward door column of a truck driver-cab.

16. An interior handle according to claim 6, wherein the handle is arranged at the instrument panel of the motor vehicle in an upright plane with the lower aperture accommodating an adjusting member for a floor vent valve of the vehicle.

17. An interior handle for motor vehicles which is arranged together with further auxiliary control means and vehicle condition indicator means within the area of an instrument panel of the motor vehicle, said handle comprising: a handle portion, said handle portion being provided with end portions disposed on both sides thereof, at least one of the further auxiliary control means and vehicle condition indicator means being connected with the handle and disposed in one of said end portions, said handle being provided with support surface means, and at least one of the end portions of the handle is provided with an aperture extending substantially transversely to the respective support surface means of said one end portion for receiving at least one of said auxiliary control means and vehicle condition indicator means, the top surfaces of the end portions pass over substantially continuously into the top surface of the handle portion, and the end portions are constructed widened at least within the areas thereof containing the aperture means as compared to the handle portion.

18. An interior handle for motor vehicles which is arranged together with further auxiliary control means and vehicle condition indicator means within the area of an instrument panel of the motor vehicle, said handle comprising: a handle portion, said handle portion being provided with end portions disposed on both sides thereof, and at least one of the further auxiliary control means and vehicle condition indicator means being connected with the handle and disposed in one of said end portions, said end portions including support surface means which are disposed at an angle to one another, and the support surface means of one end portion is angularly bent off and includes a section that is disposed in a plane substantially containing the support surface means of the other end portion.

19. An interior handle according to claim 18, wherein the handle has a form-rigid construction and is constituted by an element made of foamed plastic material which is provided with an outer cover means and into which is embedded a support frame.

20. An interior handle for motor vehicle which is arranged together with further auxiliary control means and vehicle condition indicator means within the area of an instrument panel of the motor vehicle, said handle comprising: a handle portion, said handle portion being provided with end portions disposed on both sides thereof, and at least one of the further auxiliary control means and vehicle condition indicator means being connected with the handle and disposed in one of said end portions, the handle having a form-rigid construction and being constituted by an element made of foamed plastic material which is provided with an outer cover means and into which is embedded a support frame.

* * * * *